(12) United States Patent
Buisson et al.

(10) Patent No.: US 8,061,111 B2
(45) Date of Patent: *Nov. 22, 2011

(54) CONTAINER BOTTOM AND METHODS

(75) Inventors: Gerard Laurent Buisson, Cincinnati, OH (US); James Calvin McIntyre, Arlington Heights, IL (US); Elizabeth Dominique Maczek, Mount Prospect, IL (US); James Wagner Settelmayer, Jr., West Chester, OH (US); Douglas David Sena, Jackson, TN (US); Brian Adrian Miller, Jackson, TN (US); Benito Alberto Romanach, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/957,564

(22) Filed: Dec. 1, 2010

(65) Prior Publication Data
US 2011/0067362 A1   Mar. 24, 2011

Related U.S. Application Data

(60) Continuation of application No. 11/702,403, filed on Feb. 5, 2007, now Pat. No. 7,866,128, which is a division of application No. 10/011,112, filed on Nov. 13, 2001, now abandoned, which is a continuation-in-part of application No. 09/851,040, filed on May 8, 2001, now abandoned.

(60) Provisional application No. 60/202,394, filed on May 8, 2000, provisional application No. 60/248,103, filed on Nov. 13, 2000, provisional application No. 60/248,340, filed on Nov. 13, 2000.

(51) Int. Cl.
*B65B 5/06* (2006.01)

(52) U.S. Cl. ............... 53/475; 53/467; 53/473; 53/531; 53/540; 53/247

(58) Field of Classification Search .................... None
See application file for complete search history.

(56) References Cited

U.S. PATENT DOCUMENTS

| | | | |
|---|---|---|---|
| 1,887,162 A | 11/1932 | Lorber | |
| 3,240,331 A | 3/1966 | Weinstein | |
| 3,272,383 A | 9/1966 | Harvey | |
| 3,372,812 A | 3/1968 | Parcels | |
| 3,434,626 A | 3/1969 | Kinslow | |
| 3,498,798 A | 3/1970 | Baur et al. | |
| 3,676,159 A | 7/1972 | Fallowfield | |
| 3,821,426 A | 6/1974 | Slone | |
| 3,956,489 A | 5/1976 | Beall | |
| 3,970,492 A * | 7/1976 | Amberg et al. | 156/85 |
| 4,011,347 A * | 3/1977 | Griffith | 426/124 |

(Continued)

FOREIGN PATENT DOCUMENTS
DE      1 181 121     11/1964

*Primary Examiner* — Christopher Harmon
(74) *Attorney, Agent, or Firm* — Adam W. Borgman

(57) ABSTRACT

A method of loading a plurality of articles in a container. The method can include providing a container having a body and defining an interior chamber, providing a stack of articles comprising snack pieces having a convex surface, inserting the stack of articles at least partially into the interior chamber, and reorienting the leading article by forcing the leading article against the inner surface such that the convex surface of the article cooperates with the inner surface.

5 Claims, 12 Drawing Sheets

U.S. PATENT DOCUMENTS

| | | | |
|---|---|---|---|
| 4,036,926 A | 7/1977 | Chang | |
| 4,052,838 A | 10/1977 | Hilton et al. | |
| 4,054,015 A * | 10/1977 | Rowell | 53/446 |
| 4,082,176 A | 4/1978 | Pommer | |
| 4,095,716 A | 6/1978 | Meany | |
| 4,158,265 A | 6/1979 | Kroenke | |
| 4,164,588 A * | 8/1979 | Johnson | 426/135 |
| 4,179,914 A | 12/1979 | Dulmaine | |
| 4,288,930 A | 9/1981 | Bornell | |
| 4,453,629 A | 6/1984 | Goldberg | |
| 4,525,401 A | 6/1985 | Pocock et al. | |
| 4,570,808 A | 2/1986 | Campbell et al. | |
| D297,309 S | 8/1988 | Anderson et al. | |
| 5,062,542 A | 11/1991 | Morton | |
| 5,128,157 A | 7/1992 | Ruiz | |
| D329,378 S | 9/1992 | Bustos | |
| 5,152,420 A | 10/1992 | Bird | |
| 5,263,701 A | 11/1993 | Kleinhen | |
| 5,398,479 A * | 3/1995 | Diete et al. | 53/260 |
| D361,262 S | 8/1995 | Lusker | |
| D387,278 S | 12/1997 | Olivares et al. | |
| 5,906,286 A | 5/1999 | Matsuno et al. | |
| 5,988,416 A | 11/1999 | Cheng et al. | |
| D424,378 S | 5/2000 | Bacon et al. | |
| D439,838 S | 4/2001 | Sagel et al. | |
| D440,875 S | 4/2001 | Sagel | |
| 6,213,325 B1 | 4/2001 | Cheng et al. | |
| D442,861 S | 5/2001 | Sagel | |
| 6,276,546 B1 | 8/2001 | Davis et al. | |
| 6,386,388 B1 | 5/2002 | Overholt | |
| 6,409,461 B1 * | 6/2002 | Bierschenk et al. | 414/788.2 |
| 6,471,629 B1 | 10/2002 | Gentile | |
| 6,578,344 B1 * | 6/2003 | Fluck | 53/254 |
| 7,625,590 B2 * | 12/2009 | Avis et al. | 426/392 |
| 2001/0025470 A1 * | 10/2001 | Straub et al. | 53/540 |

* cited by examiner

CONTAINER BOTTOM AND METHODS

CROSS-REFERENCES TO RELATED APPLICATIONS

This application is a continuation application of U.S. application Ser. No. 11/702,403 filed on Feb. 5, 2007, (now U.S. Pat. No. 7,866,128), which is a divisional of U.S. application Ser. No. 10/011,112 filed on Nov. 13, 2001, now abandoned, continuation-in-part of U.S. application Ser. No. 09/851,040, filed May 8, 2001 (now abandoned), which claims the benefit of U.S. Provisional Application No. 60/202,394, filed May 8, 2000 (now abandoned). U.S. application Ser. No. 11/702,403 also claims the benefit of U.S. Provisional Application Nos. 60/248,103 (now abandoned) and 60/248,340 (now abandoned), each filed Nov. 13, 2000. Each application is entirely incorporated herein by reference.

FIELD OF THE INVENTION

The present invention relates to container bottoms suitable for use in combination with container bodies. Containers comprising a container bottom and body are adapted, for example, for packaging one or more pieces (i.e., one or more articles), such as frangible snack pieces. The present invention further relates to methods of loading a plurality of articles in a container.

BACKGROUND OF THE INVENTION

Preshaped snack pieces are typically frangible and might be fragile and easily broken during packaging, shipping and/or other handling operations. Conventional packaging techniques provide bags and/or boxes that can permit a significant number of the snack pieces to break or crush prior to consumption. The well known Pringles® shaped potato chip snack pieces, a product of The Procter & Gamble Company, Cincinnati, Ohio, are individual snack pieces having a "saddle" shape and are packaged in a manner which overcomes disadvantages of the prior art. The Pringles® snack pieces have conventionally been packaged as a single nested stack in a cylindrical container which provides enhanced protection during packaging, shipping and/or other handling. As a result, the Pringles® snack pieces are typically presented to the consumer without breakage.

The "saddle" shape of the Pringles® snack pieces provide oppositely facing concave surfaces that present curved edges to engage a planar portion of the container when loading the chips. Pringles® snack pieces may be loaded by horizontally positioning an elongated circular cylindrical container and thereafter horizontally inserting a stack of snack pieces therein. As the snack pieces are inserted, the leading snack pieces typically tip over out of proper alignment with the remaining stack until the outer edge of the leading snack piece engages a flat planar surface of the bottom wall wherein the curvature of the outer edge of the snack piece facilitates reorientation of the leading snack piece to form a nested stack of snack pieces.

There is a continuing need for user-friendly, relatively inexpensive containers for packaging various frangible snack pieces to provide protection against breakage during packaging, shipping and/or other handling. It is further desired to provide containers that facilitate loading of snack pieces during production. There is further demand for containers that provide a user-friendly package and provide oxygen and moisture protection to prevent spoilage of snack pieces contained therein.

SUMMARY OF THE INVENTION

Accordingly, the present invention provides container bottoms which can be used in combination with container bodies and methods of loading articles. Each container bottom according to the present invention can be used in combination with a container body to package one or more pieces, such as substantially triangular pieces. In one application, containers may be used to package snack pieces. For example, the containers may be used to package a stack of substantially triangular-shaped snack pieces to provide consumers with a product having minimum breakage prior to consumption.

In accordance with exemplary embodiments of the present invention, a substantially triangular shaped container bottom includes a bottom wall with a concave surface.

In accordance other exemplary embodiments of the present invention, containers are provided. The containers include a container body defining an interior chamber and a container bottom attached to the container body. The container bottom includes a central surface area that is inwardly concave towards the interior chamber.

In accordance with additional embodiments, combinations are provided. Each combination includes a container with a container body defining an interior chamber and a container bottom attached to the container body. The container bottom includes a central surface area that is inwardly concave towards the interior chamber. A plurality of articles are disposed in a nested stack in the interior chamber of the container. The article adjacent the container bottom includes a convex surface engaging the concave surface of the container bottom.

In still further embodiments of the present invention, methods of loading a plurality of articles in a container are provided. The methods include the steps of providing a container defining an interior chamber and a bottom wall including an inner surface. A stack of articles is provided and is inserted at least partially into the interior chamber until the leading article of the stack of articles contacts the inner surface of the bottom wall with an Angle Between Tangent(s) ("ABT") of less than or equal to about 45°. The leading article is reoriented by forcing the leading article against the inner surface.

Advantageously, the container bottoms, containers, combinations and methods according to the invention provide improved packaging for pieces such as substantially triangular-shaped snack pieces. Additional advantages and objects will be more fully apparent in view of the following detailed description.

BRIEF DESCRIPTION OF THE DRAWINGS

While the specification concludes with claims which particularly point out and distinctly claim the present invention, it is believed that the present invention will be better understood from the following description of specific embodiments, taken in conjunction with the accompanying drawings, in which like reference numerals identify like elements, and wherein:

DETAILED DESCRIPTION OF EXEMPLARY EMBODIMENTS

Figure 1:
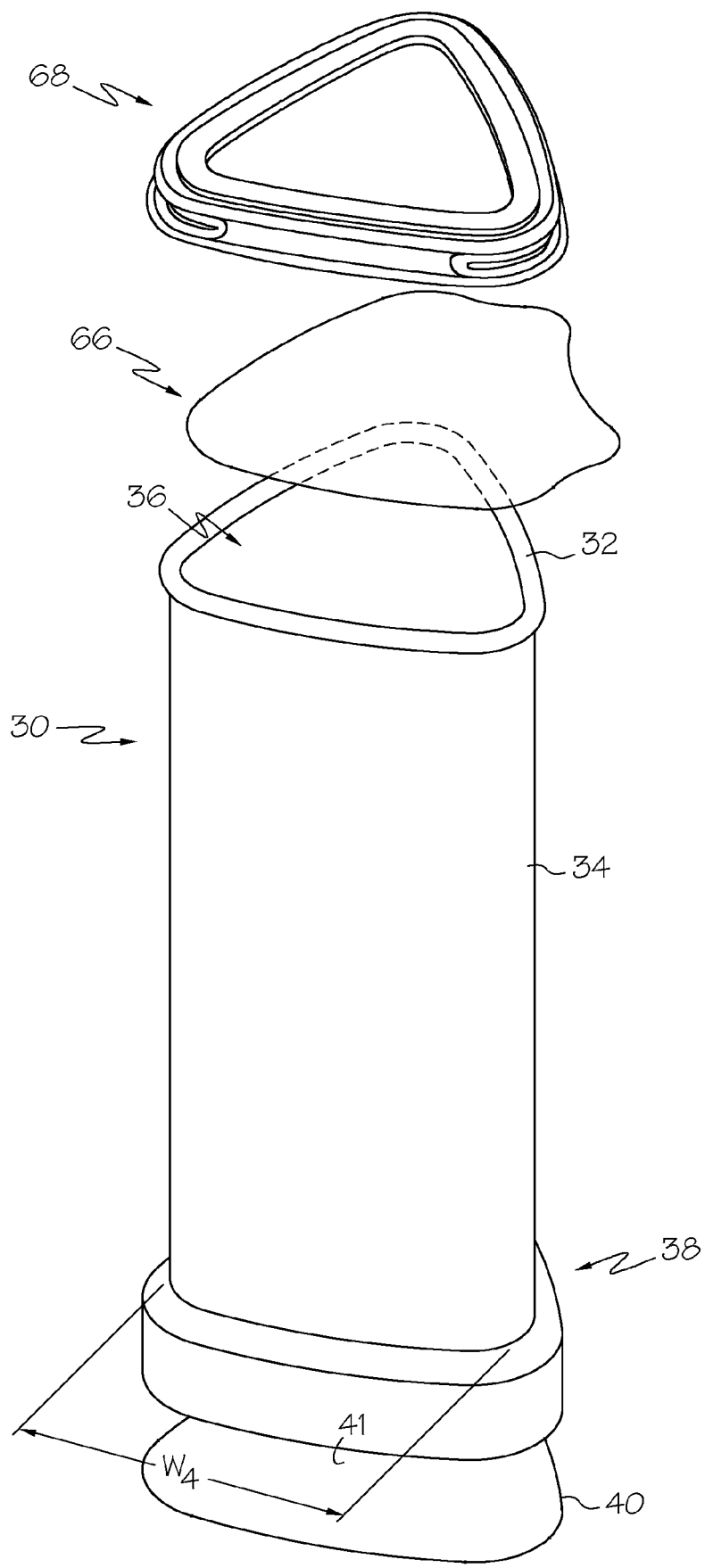
FIG. 1 is a perspective view of one embodiment of a substantially triangular shaped container in accordance with the present invention.

Exemplary embodiments of the present invention comprise substantially triangular-shaped container bottoms. Further exemplary embodiments comprise containers including container bottoms and corresponding container bodies. Container bottoms described throughout this application intend to include the closed end of the container when loading a plurality of chips through the open end. Thus, the container bottom could eventually function as either the container bottom or the container top after loading and packaging the snack pieces. For example, the container bottom could comprise the membrane lid that will eventually function as a removable lid after loading the container and sealing the open end of the container with a closure that eventually functions as the bottom of the container. Alternatively, as illustrated in FIGS. 1-5, the container bottom could also function as the bottom of the container once the snack pieces are loaded and packaged within the container.

Exemplary containers are disclosed in the copending U.S. Provisional Application No. 60/248,340 of Buisson et al. filed Nov. 13, 2000, entitled "An Improved Plastic Package for Snack Pieces."

It will be understood that each of the containers of the present invention may comprise a container bottom that is integrally formed with the container body. For instance, both the container bottom and the container body may be formed simultaneously during a blow molding process. In alternative embodiments, each container body and container bottom may be formed separately and thereafter attached to one another. In one example, the container bottom can be slid over or within the container body and then attached by adhesive, thermal bonding, or the like. In still further embodiments, the container bottom may be attached to the container body after abutting one against the other. An intermediate attachment portion, such as a substantially triangular band of material, may also be provided to attach the container bottom to the container body.

The containers used in accordance with the present invention permit packaging of one or more pieces (i.e., one or more articles), such as substantially triangular-shaped pieces. In one application, one or more snack pieces may be packaged, and in particular embodiments, one or more substantially triangular-shaped snack pieces may be packaged to present consumers with an accessible product with minimal breakage. It is contemplated that a wide variety of snack pieces may be packaged with a container having a wide variety of cross-sectional shapes. For example, containers having substantially circular, substantially elliptical, substantially rectangular, substantially square, substantially triangular (e.g., see FIG. 1), or other shapes could be provided in accordance with the present invention to package snack pieces having substantially triangular (e.g., see FIG. 6), substantially circular, substantially elliptical, substantially rectangular, substantially square or other shaped snack pieces such as chips (e.g., tortilla chips, potato chips, vegetable chips, fruit chips, bagel chips), crackers, biscuits, cookies, candy, or the like. Each of the above mentioned exemplary snack piece shapes could be packaged in alternate containers having one or more of the above-referenced container shapes. While exemplary embodiments of the present invention are described for use with edible snack pieces, the containers of the present invention may also be useful to store, package and/or ship other piece(s), including, but not limited to, a plurality of frangible or fragile pieces (i.e., a plurality of frangible or fragile articles) in a stacked relationship.

The interior surfaces of the containers of the present invention may be structured to assist in loading the pieces, such as the snack pieces, as well as supporting the articles after packaging. For example, as a stack of snack pieces are horizontally inserted into an elongated container, a domino effect might occur as the leading and successive snack pieces tip over out of proper alignment. Snack pieces might tend to tip over out of proper stacked alignment due to various factors, for example, lower loading speeds, insufficient acceleration as the snack pieces are being loaded, orientation of the container or stack of pieces, or the like.

Typically, a bottom wall of the container may not have a surface adequate to realign exemplary snack pieces and/or may result in snack piece breakage as the leading snack piece contacts the container bottom wall. For example, the leading snack piece may resist rotation to the proper position once it contacts the bottom wall, thereby possibly resulting in crushed snack pieces as the remaining stacked snack pieces are forced into the container. Alternatively, one or more leading snack pieces may rotate further out of proper alignment as the remaining snack pieces bypass the one or more misaligned snack pieces. Accordingly, the bypassed or slipped snack piece(s) remain disposed adjacent the remaining stack of snack pieces, thereby possibly causing an interference problem, or presenting an inconvenience and/or disorganized appearance to the consumer. In another example, the failure of the leading snack piece to properly align may result in misalignment of the entire stack of snack pieces. Such misalignment prevents efficient use of the container space and therefore may prevent all of the pieces from sufficiently entering the container. Indeed, the outermost pieces of the stack may fall from the container, thereby contaminating the surrounding environment and/or preventing insertion of a sufficient number of snack pieces in the container.

In order to prevent or delay the snack pieces from tipping over and out of proper alignment, the snack pieces might be accelerated and/or loaded at higher velocities. However, excessive snack piece velocity during packaging can result in breakage due to the momentum of the snack pieces and resulting impulse from a sudden collision with the bottom wall.

In accordance with the present invention, each of the container bottoms includes a bottom wall with a surface that is structured to permit reorientation of a leading snack piece being inserted in the container. In exemplary embodiments, the lower wall can be planar for contact with a sufficiently convex surface of a snack piece. In additional exemplary embodiments, the bottom wall is substantially inwardly concave towards an interior chamber to engage with a convex surface or a planar surface or edge of a snack piece. The inwardly concave surface of the bottom wall minimizes snack piece breakage and misalignment when loading the snack pieces for packaging. Convex surfaces of the snack pieces may cooperate with the inwardly concave bottom wall of the container to assist in rotating the leading snack piece, and thereafter the remaining snack pieces, into a properly aligned stacked position. The inwardly concave surfaces of the bottom wall also assist in reducing the impulse force acting on snack pieces engaging the bottom wall. The snack pieces can be loaded at various loading velocities. Increased loading velocity is desired to reduce the loading time for packaging the stack of snack pieces in the container. However, the loading velocity should not be set so high as to cause snack piece breakage. Providing an inwardly concave surface can reduce the magnitude of the impulse acting on the snack piece as it contacts the bottom wall. Accordingly, the maximum loading velocity can be increased by providing the bottom wall with an inwardly concave surface.

As described above, the interior surfaces of the container may be structured to permit orientation of the snack pieces to minimize the extent of snack piece breakage that might otherwise occur after the snack pieces are loaded in the container. The structure of the interior surfaces may also be arranged to enhance the accessibility of the product to the consumer. For example, providing a container with a flat bottom may not provide an adequate distribution of force over the surface area of a snack piece with a convex lower surface and a concave upper surface. For instance, in a flat bottom container, the leading snack piece loaded in an upwardly concave manner would be required to support the weight of the entire snack piece stack along a contact area comprising the central point or central location of the snack piece in contact with the flat bottom wall. Alternatively, loading the snack pieces in a downwardly concave manner would require the leading snack piece to support the weight of the snack piece stack along a contact area comprising the outer edges of the snack piece in contact with the flat bottom wall. Due to the frangible nature of the snack pieces, they may break or crush due to the excessive stresses at the contact locations.

In accordance with exemplary embodiments, the bottom wall of the containers include an interior surface with a substantially concave shape towards the interior chamber to facilitate loading snack pieces and to permit upwardly concave stacking, thereby minimizing stress concentrations in the snack piece while presenting the snack piece edges closer to the top of the container to facilitate removal by the consumer. Alternatively, it is contemplated that the bottom wall may be constructed with a surface that is substantially inwardly convex towards the interior chamber. The convex surface may minimize stress concentrations in the snack piece being supported by the bottom wall such that the convex surface conforms to a concave surface of the snack piece. However, loading the snack pieces in this manner would require the snack pieces to be oriented such that they are concave towards the bottom wall, thereby positioning the snack piece edges farther away from the top of the container than the central portion of the snack piece. Removal of the snack pieces by grasping the edges is difficult when positioning the snack piece edges farther away from the top of the container. Moreover, loading of the snack pieces may result in snack piece breakage since the inwardly convex bottom wall surface of the container can trap, rather than facilitate reorientation, of the snack pieces contacting the bottom wall.

Figure 6:
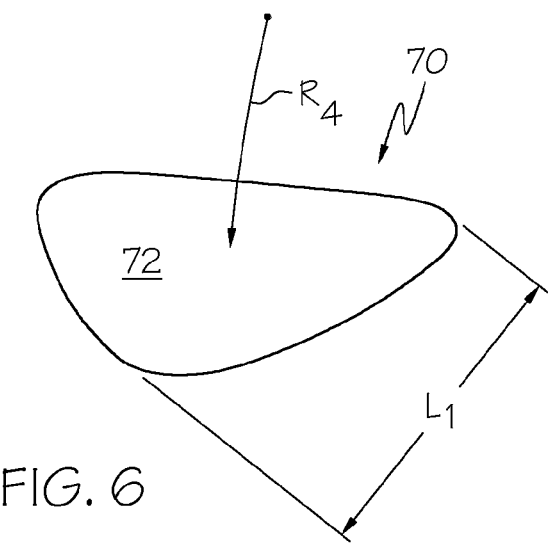
FIG. 6 is a perspective view of a spherically concave snack piece in accordance with one aspect of the present invention.

Referring now to the drawing figures in detail, wherein like numerals indicate the same elements throughout the views, FIG. 1 depicts a substantially triangular-shaped container 30 for stacking a plurality of snack pieces 70 (e.g., see FIG. 6). Within the context of the present invention, "substantially triangular-shaped" generally includes a three-side polygonal shape wherein the sides are connected with one another at respective corners which comprise a sharp angle or a more rounded configuration. The corners connect straight or substantially straight sides. Within the present invention, "straight" may include a distance between the corners, rather than requiring any surface or cross-sectional configuration of the sides. In exemplary embodiments, the container bottom has a substantially equilateral triangular shape, wherein the sides of the triangular shape are of equal or substantially equal length. In other embodiments, the container bottom has a substantially isosceles triangular shape, wherein two sides of the triangular shape are of equal or substantially equal length.

The container 30 can be formed from a variety of materials including one or more of the following: paper products (e.g., cardboard, corrugated cardboard, corrugated paper, kraft paper, extensible paper); plastic; composites of plastic and/or paper; laminates of plastic and/or paper; aluminum foil; metals, or the like. In one example, the container 30 may be formed of a thermoplastic material and can be blow molded, although other production methods may be employed. Suitable thermoplastic materials include, but are not limited to, polyolefins, such as polyethylene and polypropylene, vinyl polymers such as ethyl vinyl alcohol (EVOH), or the like. These materials might be monolayered or multilayered, wherein different layer materials may be combined. For example, a multilayer material may include both a polyolefin layer and an EVOH layer. In a specific embodiment, the container 30 is blow molded from a multilayer material comprising a layer of EVOH sandwiched between two layers of high density polyethylene (HDPE). The container can typically have a wall thickness from about 0.013 cm to about 0.140 cm.

The containers of FIG. 1 include a container body 34, a container bottom 38 and a lip 32. In one particular embodiment, the containers are a blow-molded, multiple-layer plastic structure including: a virgin polyolefin layer, a tie layer, a layer of EVOH, another tie layer, and another virgin polyolefin layer. Typically, container 30 will also have one or more layers of regrind material between at least one of the tie layers and the virgin polyolefin layers. The layer of EVOH might be no less than 0.00005 inches thick and no thicker than 0.006 inches, for example no less than 0.00005 inches and no greater than 0.003 inches and in another more specific example, no less than 0.0001 inches and no greater than 0.0012 inches.

An even more particular example of this multilayer plastic structure comprises a six-layer structure including the following layers (from the outside layer to the inside layer): about 9.31 grams (g) or about 19.4% by weight of HDPE; about 18.91 g or about 39.4% by weight of plant regrind and HDPE; about 0.62 g or about 1.3% by weight of a tie layer; about 2.02 g or about 4.2% by weight of EVOH; about 0.62 g or about 1.3% of a tie layer; and about 16.51 g or about 34.4% of plant regrind and HDPE. Another example of this six-layer structure can comprise (from the outside layer to the inside layer): about 10.7 grams (g) or about 19.4% by weight of HDPE; about 21.66 g or about 39.4% by weight of plant regrind and HDPE; about 0.69 g or about 1.3% by weight of a tie layer; about 2.33 g or about 4.2% by weight of EVOH; about 0.69 g or about 1.3% of a tie layer; and about 18.94 g or about 34.4% of plant regrind and HDPE. Yet another example of this six-layer structure can comprise (from the outside layer to the inside layer): about 15.0% by weight of HDPE homopolymer and color; about 63.6% by weight of plant regrind (60% by weight) and HDPE homopolymer and color (40% by weight); about 1.4% by weight of a tie layer; about 3.6% by weight of EVOH; about 1.4% of a tie layer; and about 15.0% of plant regrind and HDPE homopolymer and color.

Figure 2:
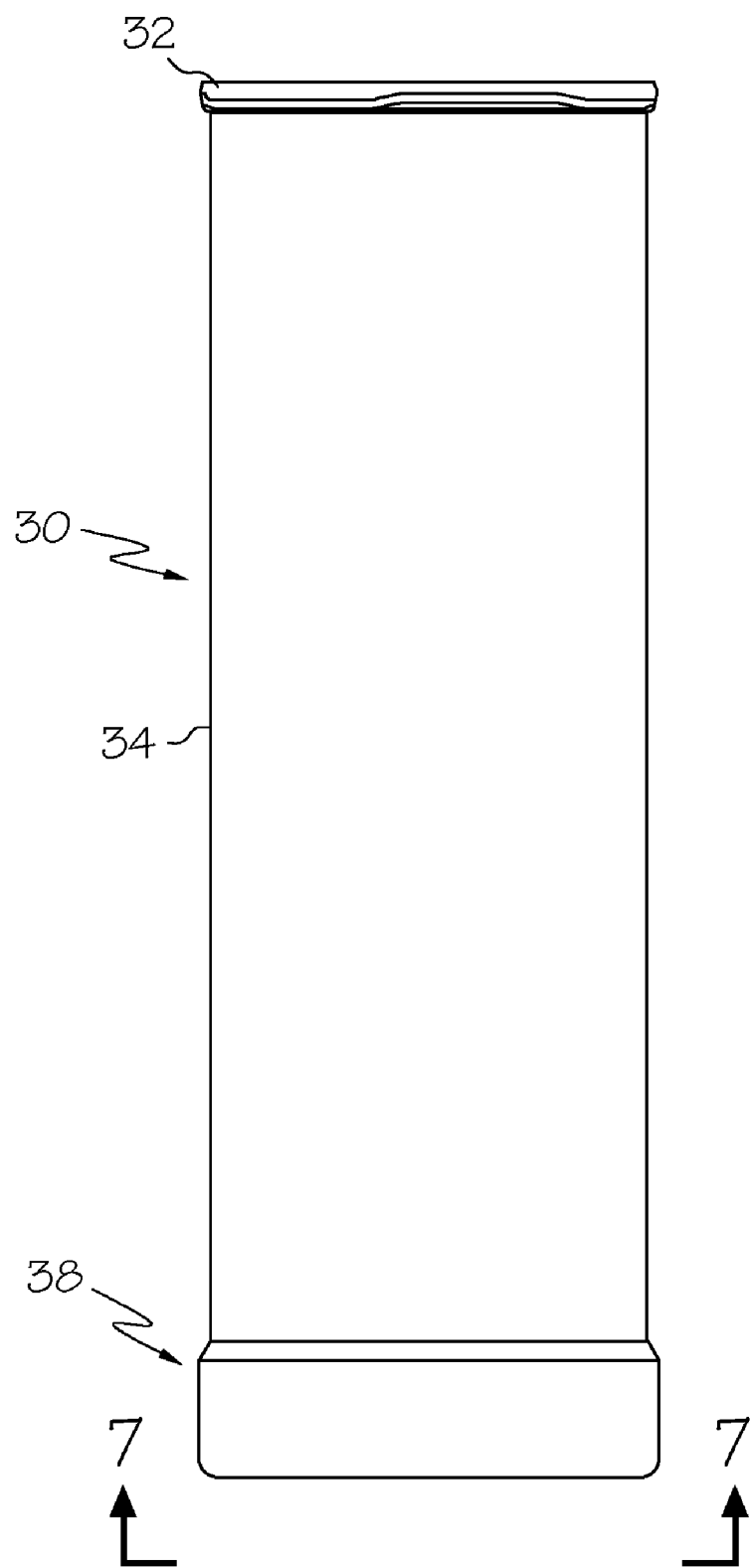
FIG. 2 is an elevational side view of a portion of the container of FIG. 1.
Figure 5:
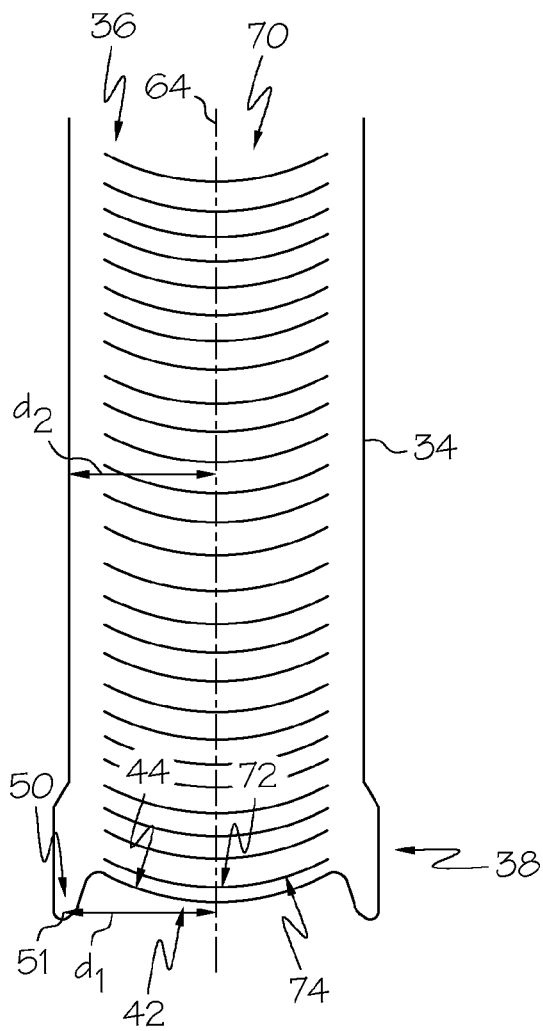
FIG. 5 is a schematic sectional illustration of portions of the container in a vertical position after the snack pieces have been inserted therein.

FIGS. 1 and 2 illustrate the container 30 including a container body 34 and a container bottom 38, wherein FIGS. 7-12 further illustrate exemplary features of the container bottom 38. The container bottom 38 is enlarged for supporting the container 30 in an upright position and can be dimensioned to facilitate the manufacturing process. Indeed, with reference to FIG. 5, the container body 34 has a first maximum cross-sectional width taken along an imaginary plane that is perpendicular to a geometric central axis 64 extending from the container bottom 38, and the container bottom 38 has a second maximum cross-sectional width taken along another imaginary plane that is perpendicular to the geometric central axis 64. The second maximum cross-sectional width is larger than the first maximum cross-sectional width. As illustrated in FIG. 5, for example, at least a portion 51 of the lateral cavity 50 extends a greater distance along a first radial line "$d_1$" extending perpendicular from the geometric central axis 64 than a maximum distance between the container body and the geometric central axis 64 along a second radial line "$d_2$" parallel to the first radial line "$d_1$".

Figure 3:
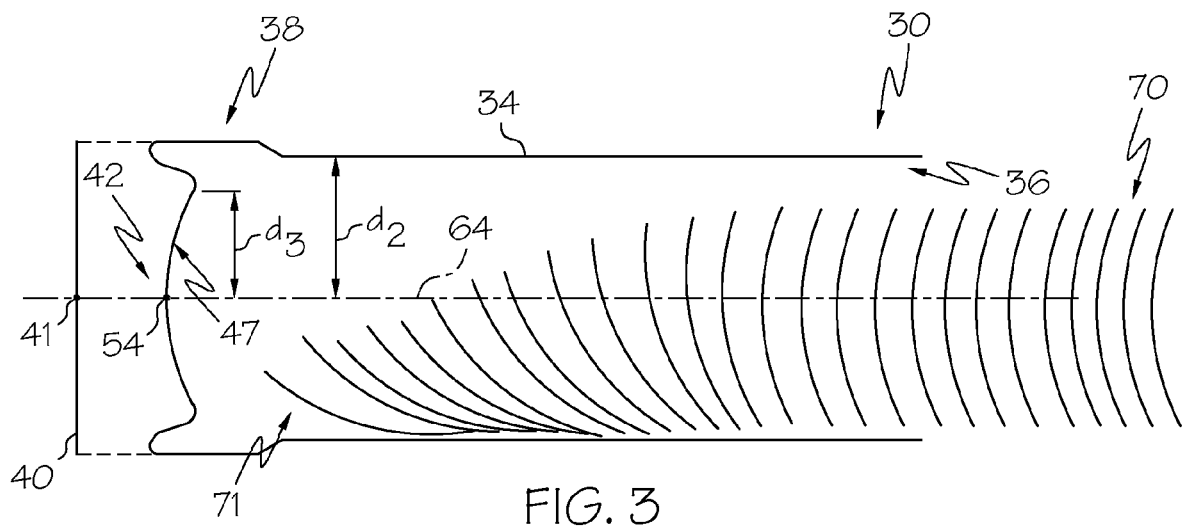
FIG. 3 is a schematic sectional illustration of a horizontally disposed container with concave snack pieces being inserted therein wherein the leading snack piece is at least partially tipped over out of proper stacked alignment.
Figure 7:
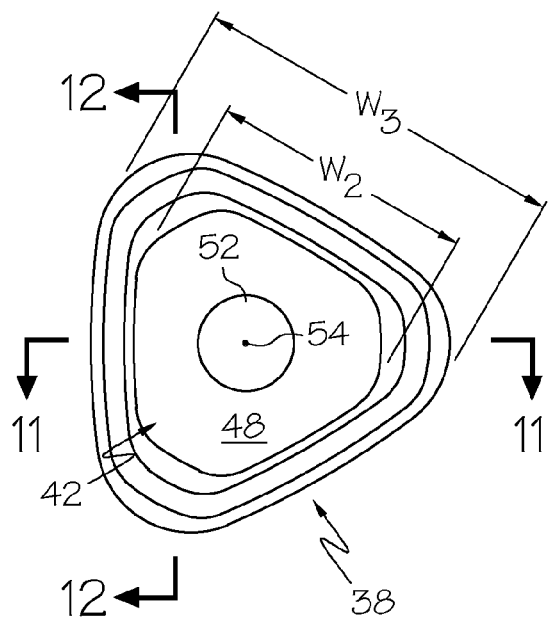
FIG. 7 is a bottom plan view of the substantially triangular container taken along line 7-7 of FIG. 2.
Figure 8:
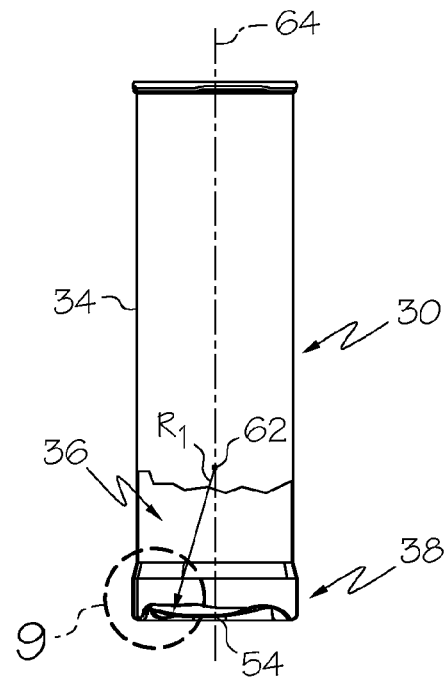
FIG. 8 is a fragmentary partial cross-sectional view of the container of FIG. 1 taken along a line bisecting one corner and intersecting a midpoint of the opposite side.

Throughout this application, the geometric central axis is the axis that extends perpendicular to a planar projected foot print surface of the container bottom and through a center of gravity of the foot print surface. The geometric center of the container bottom is one or more points of the container bottom in contact with the geometric central axis. For example, as illustrated in FIG. 1, the container bottom 38 defines a horizontal planar projected foot print surface 40 that is horizontally oriented with a center of gravity 41. As illustrated in FIG. 3, a geometric central axis 64 extends perpendicular to the planar projected foot print surface 40 and through the center of gravity 41 of the surface 40. As shown in FIGS. 7 and 8, the geometric center 54 is located at one or more points of the container bottom 38 in contact with the geometric central axis 64.

Figure 9:
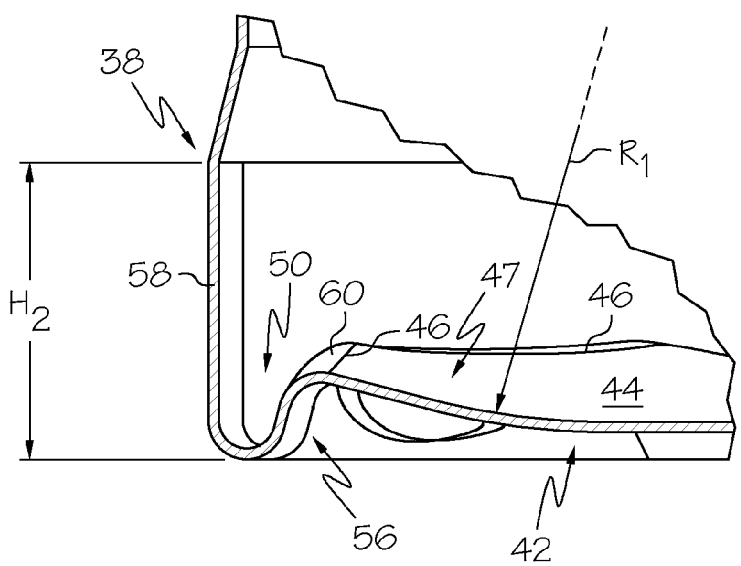
FIG. 9 is an enlarged partial view of the Detail 9 in FIG. 8, showing portions of the container bottom.

As illustrated in FIG. 9, the enlarged container bottom 38 includes an inner wall 56 and an outer wall 58. The inner wall 56 includes a transition portion 60 to connect the inner wall 56 with a bottom wall 42 at an edge 46 of the bottom wall 42. The transitional portion 60 can facilitate production of the container bottom 38 with a blow molding process and can have a length that is sufficiently long to permit blow molding while being sufficiently short to permit loading of snack pieces in the container without trapping the pieces in a lateral cavity 50 defined between inner and outer walls 56, 58 of the container bottom 38.

The blow ratio of the lateral cavity 50 should be sufficient to facilitate formation of the container bottom 38 by a blow molding process. The blow ratio of the lateral cavity 50 can be defined as the ratio of "$H_1$" to "$W_1$" (See FIG. 10), wherein "$H_1$" represents the vertical distance between the upper-most portion of the inner wall 56 (e.g., at an upper-most part of the transition portion 60 of the inner wall 56) and the lower-most portion of the container bottom 38 and wherein "$W_1$" represents the distance between the outer wall 58 and the upper-most point of the transition portion 60 of inner wall 56. In exemplary embodiments, the blow ratio may be from about 0 (e.g., a flat bottom) to about 3.0. In one exemplary embodiment, the blow ratio is about 0.72 when "$H_1$" is about 0.59 cm and "$W_1$" is about 0.82. In another embodiment, the blow ratio is about 0.43 when "$H_1$" is about 0.59 cm and "$W_1$" is about 1.37 cm. One skilled in the art can readily select an appropriate blow ratio for the lateral cavity of the container bottoms of the present invention using standard blow molding techniques.

Figure 10:
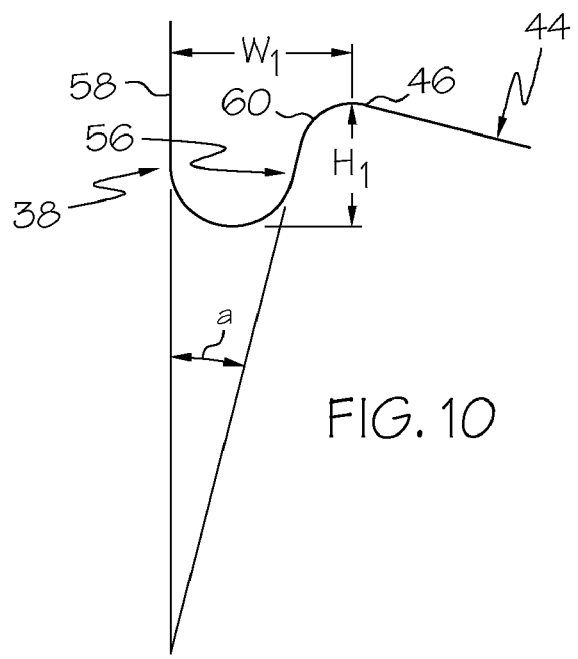
FIG. 10 is a partial schematic view of FIG. 9.

FIG. 10 also shows a lead angle "a" defined as the angle between the inner wall 56 and the vertical. The lead angle "a" may be large enough to allow the container to be stripped or ejected from a mold without damaging the container bottom 38. In one embodiment, the lead angle "a" is less than 90°. In another exemplary embodiment, the lead angle "a" is from about 20° to about 75°. In still another exemplary embodiment, the lead angle "a" is from about 30° to about 60°. Using standard blow molding techniques, one skilled in the art can easily determine sufficient lead angles "a" to avoid complications during the blow molding process.

Exemplary bottom walls 42 of the present invention can also comprise a central surface area 47, as seen in FIG. 3, including an inwardly concave surface 44. In exemplary embodiments, the central surface area 47 is defined radially about the geometric central axis 64. As shown in FIG. 3, each point of the perimeter of the central surface area 47 can extend a radial distance along a radial line "$d_3$" that has a length less than about 100% (for example, less than about 85%; and in another example less than about 50%) of the maximum radial distance between the container body 34 and the geometric central axis 64 along the second radial line "$d_2$" parallel to the radial line "$d_3$". Providing the central surface area with portions of the concave surface enhances effectiveness of the surface area to reorient the articles to be loaded.

As described above, the inwardly concave surface may assist in loading, packaging, and/or supporting the snack pieces. The inwardly concave surface 44 may have a variety of shapes depending on the particular application. For example, the inwardly concave surface 44 may be provided with a curvature similar or substantially identical to a curvature of the snack piece being supported. In one example, the inwardly concave surface comprises a spherical inwardly concave surface. As shown in FIGS. 8 and 9, a spherically inwardly concave surface 44 can have a radius of curvature "$R_1$" with a center of curvature 62 located on the geometric central axis 64 of the container bottom 38. As illustrated in FIGS. 7-9, the geometric central axis 64 is a tri-symmetrical axis of symmetry wherein the tri-symmetrical axis divides the container bottom 38 in three substantially identical sections radially disposed about the geometric central axis 64. In alternative embodiments, the center of curvature can be located on a bi-symmetrical axis or plane of an isosceles triangle, circle, or other bi-symmetrical shape. The center of curvature could also be disposed along a quad-symmetrical axis or other axes with increased degrees of symmetry. In further embodiments, the center of curvature is located outside an axis or plane of symmetry of the bottom wall. However, it can be beneficial to locate the center of curvature along an axis or plane of symmetry to assist in aligning the snack pieces in a substantially centered orientation within the interior chamber of the container body.

Figure 19:
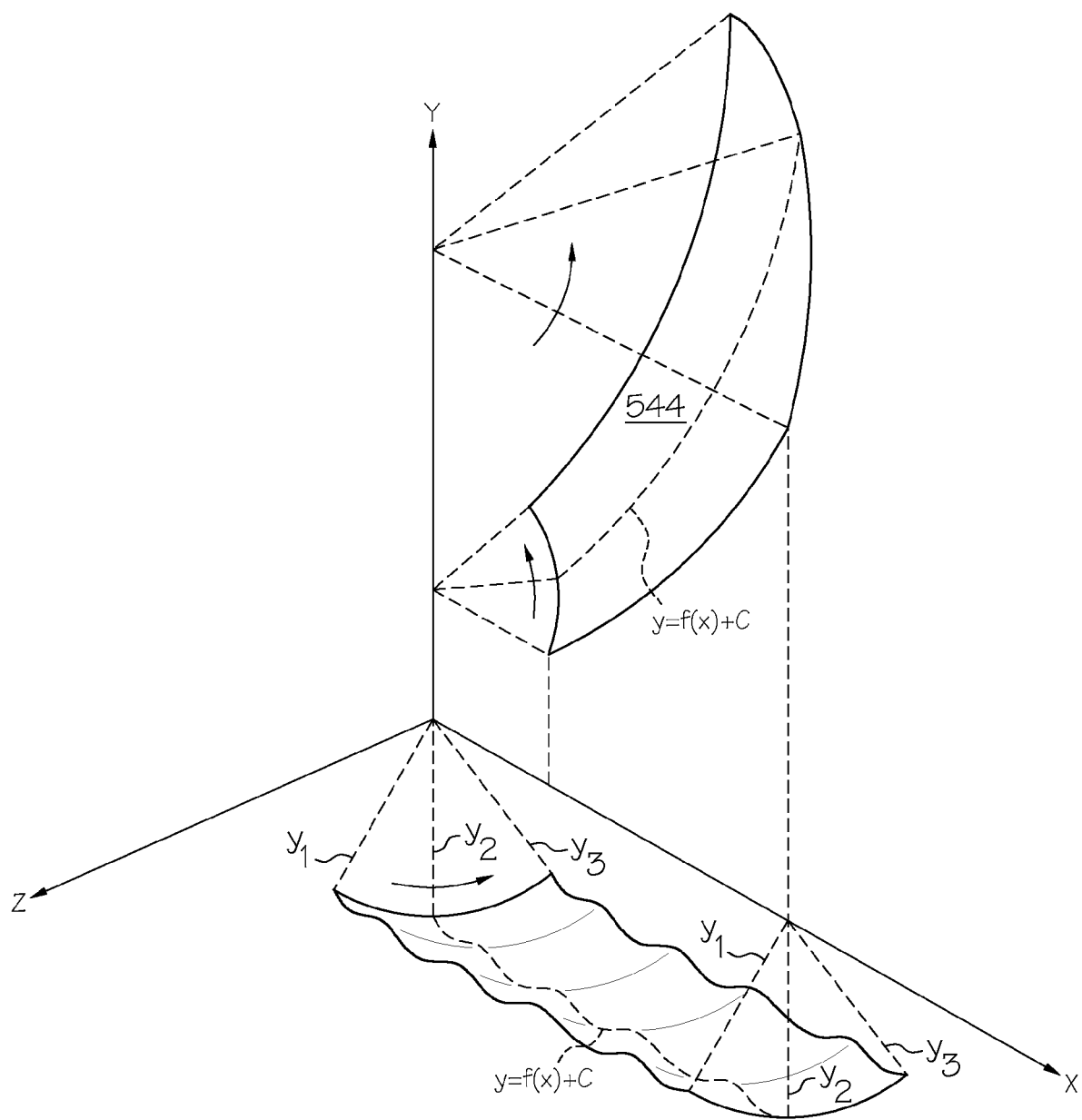
FIG. 19 illustrates exemplary concave surfaces in accordance with the present invention.

The inwardly concave surface of each of the embodiments of the present invention may include a wide variety of alternative configurations depending on the particular application. For example, as illustrated in FIG. 19, the inwardly concave surface 544 can include a surface generated by rotating a function "y=f(x)+C" about the Y-axis. For instance, a curve, line, or series of segments can be rotated about a vertical axis to generate a concave surface. FIG. 19 depicts one particular embodiment where a paraboloid surface can be defined by rotating a function defining a parabola "y=f(x)+C" about the Y-axis. In further embodiments, a spherically concave surface could be formed by rotating an appropriate function to define a sphere or hemisphere.

FIG. 19 further illustrates generating a scoop-type inwardly concave surface 644 by rotating a function "y=f(x)+C" about the line of curvature (e.g., the X-axis) wherein "C" may remain the same or change as the function rotates. The function "y=f(x)+C" could be a curve, line, series of segments or the like. In addition, the constant "C" of the function represents an offset distance wherein an initial offset distance $y_1$ can be different from the final offset distance $y_3$. In one example, as shown in FIG. 19, the offset distance remains constant as the function is rotated such that $y_1$, $y_2$ and $y_3$ are constant. In another example, the offset distance can change during rotation wherein $y_1$, $y_2$ and/or $y_3$ are the same or different.

In one example, the scoop-type inwardly concave surface 644 could comprise a portion of a circular cylindrical surface of a cylinder. To form the circular cylindrical surface, the function "y=f(x)+C" is simply the offset distance (i.e., y=C), wherein the offset distance remains constant during rotation of the function.

In another example, as illustrated in FIG. 19, the function "y=f(x)+C" could be a sinusoidal function to generate a concave waved shape surface 644. Such a concave waved surface may be useful to load waved snack pieces (e.g., waved potato chips or the like). As shown in FIG. 19, the function can be offset from the X-axis (e.g., an initial distance $y_1$, intermediate distance $y_2$, and final distance $y_3$). The offset distance could remain the same during rotation of the function about the X-axis such that $y_1$, $y_2$, and $y_3$ are the same. Alternatively, the offset distance could change during rotation of the function about the X-axis such that $y_1$, $y_2$, and/or $y_3$ are the same or different. In one example, a substantially U-shaped concave surface could be created by initially increasing the offset distance and then later decreasing the offset distance as the function rotates. In one particular example a U-shaped concave surface could be created wherein $y_1$ and $y_3$ are the same while $y_2$ is greater than $y_1$ and $y_3$. Such a surface may reduce breakage incidents by assisting in gradual reorientation of the snack pieces during insertion of the snack piece stack in the container.

Thus, the inwardly concave surface in accordance with each of the embodiments of the present invention may include a wide variety of surface shapes including scoop-type concave surfaces (e.g., V-shaped, W-shaped, sinusoidal, corrugated-shaped or the like), circular shapes, paraboloid shapes, or the like.

In one exemplary embodiment, as illustrated in FIG. 5, the snack pieces 70 can have a spherically convex surface 74 that conforms to the inwardly spherically concave surface 44 of the bottom wall 42. As further illustrated in FIGS. 5 and 6, the snack pieces 70 may further include a spherically concave surface 72 adapted to conform to the spherically convex surface 74 of an adjacent snack piece. For example, exemplary triangular snack pieces 70 including a convex surface 74 with a radius of curvature similar or substantially identical to the radius of curvature $R_4$ of the concave surface 72 permits the snack pieces 70 to be loaded in a container such that they are positioned in a nested stacked relationship relative to one another. In one particular example, as illustrated in FIG. 5, a plurality of snack pieces are loaded in a nested, stacked relationship with at least one snack piece surface being substantially offset from one another so that adjacent snack pieces abut one another (the offset distances between the snack pieces are exaggerated in FIG. 5 for clarity).

The container body 34 may also be shaped with an inner surface similar to the outer perimeter of the snack pieces (e.g., with a substantial triangular shape) to assist in maintaining the stacked pieces in proper alignment once the snack pieces are loaded in the container 30. Providing the exterior of the container body with a similar shape (e.g., with a substantial triangular shape) as the inner surface of the container can also reduce material costs while providing consumers with information regarding the snack piece shape packaged therein.

The concave surface 44 has a sufficient size to guide the snack pieces 70 as they are loaded in the container 30 while the inner and outer walls 56, 58 defining the lateral cavity 50 have a sufficient blow ratio to permit manufacture of the single piece container bottom 38 by blow molding, as discussed above. In one embodiment, the concave surface 44 has a width "$W_2$" between adjacent corner areas of about 50% to about 90% of the width "$W_3$" between adjacent corner areas of the container bottom 38 (best illustrated in FIG. 7). In one example, "$W_2$" is about 5.06 cm and "$W_3$" is about 7.85 cm such that "$W_2$" is about 64% of $W_3$".

As shown in FIG. 1, the container 30 defines an interior chamber 36 and is designed to hermetically seal snack pieces within the interior chamber with a membrane lid 66. For example, the container 30 may optionally include a container membrane lid and container lip as disclosed in U.S. Provisional Application No. 60/248,026, filed Nov. 13, 2000, and also U.S. Patent Application No. 2002/0117500A1, published Aug. 29, 2002 (now abandoned), entitled "Structures For Providing A Removable Closure", filed herewith, the entire disclosures of which are incorporated herein by reference.

When hermetically sealed, the pressure of the interior chamber 36 will fluctuate depending on external conditions such as the surrounding atmospheric pressure and temperature. Accordingly, changes in altitude, weather and/or temperature, for example, may cause a significant fluctuation of the interior chamber pressure. In certain embodiments of the present invention, the container 30 is fabricated with a sufficiently flexible material that permits the bottom wall 42 to bulge or bow outwardly in response to increases in interior chamber pressure. In such embodiments, it is desirable to structure the container bottom 38 to prevent formation of a rocker bottom (i.e., wherein the bottom wall permits rocking, tipping and/or rotation of the container 30) that might result if the bottom wall 42 bulges or bows outward to a point below the lower-most portion of the container bottom 38.

Figure 11:
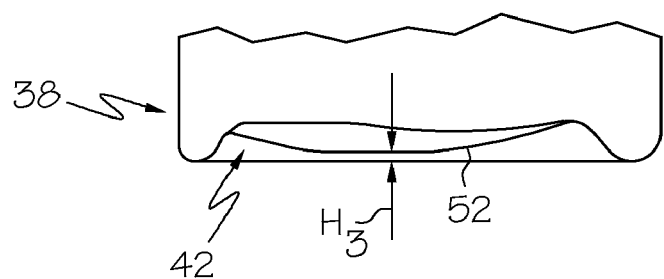
FIG. 11 is a schematic partial cross-sectional view taken along line 11-11 in FIG. 7.
Figure 12:
FIG. 12 is a schematic partial cross-sectional view taken along line 12-12 in FIG. 7.

In some embodiments, it is desirable to design the container 30 to resist formation of a rocker bottom at 7,500 feet above sea level. In one example, the container bottom 38 can be designed with a sufficient initial center height "$H_3$" (i.e., the initial difference in height between the lower-most portion of the bottom wall 42 and the lower-most portion of the container bottom 38, as shown in FIG. 11). For example, depending on the container wall thickness and material properties, the rocker effect may be avoided by providing an initial center height "$H_3$" from about 0 cm to about 0.30 cm, and more specifically about 0.15 cm in exemplary embodiments. In exemplary embodiments, "$H_3$" may be zero or slightly greater than zero by fabricating the container bottom 38 from a sufficiently rigid material and/or by providing the container bottom 38 with a sufficient wall thickness or reinforcement to prevent undesirable outward bulging or bowing of the bottom wall 42 when subjected to such increases in interior chamber pressure.

While certain embodiments may provide a container bottom with an initial height "$H_3$", greater than zero the container bottom should be able to provide a bottom wall, such as a bottom wall with an inwardly concave surface 44, sufficient to perform the desired function. For instance, exemplary embodiments of the radius "$R_1$" of the inwardly concave surface 44 (e.g., see FIGS. 8-9) can be from about 2 inches to about 6 inches, for example, from about 3 inches to about 6 inches, and more specifically about 3.4 inches. The radius "$R_1$" may vary depending on a variety of factors, for example, the curvature and size of the snack pieces 70 to be packaged.

As illustrated in FIG. 7, the container bottom 38 may include an optional identification location or mark 52, for example, near the center of an outwardly convex surface 48 of the bottom wall 42. An identification mark can be used to convey recycle codes, identification codes, patent information, or other product-related information. In one embodiment, if provided, the identification area or mark 52 may also be located at or near the center 54 of the bottom wall 42. The identification area 52 may comprise a small and generally flat area in the outer convex surface 48, if desired, to facilitate seating of a label and/or protection of an applied label.

As shown in FIGS. 2 and 5, the container bottom 38 can extend beyond the perimeter of the container body 34. For example, the container bottom 38 can be provided with an enlarged cross section when compared to the container body 34, to thereby resist tipping of the container while assisting in maintaining the container 30 in a substantially self-supported vertical orientation. Therefore, enlarging the container bottom will increase the tip angle of the container, namely the angle at which the container may be tilted just before tipping over. Increasing the tip angle reduces the likelihood of container tip overs by enhancing the ability of the container to regain its vertical posture when handling, transporting or otherwise disrupting the container.

When a plurality of containers abut one another or are clustered in close proximity, further instances of tipping might occur. For example, a plurality of identical containers may abut one another when shipping, packing, or transporting the containers on an assembly line. Particular problems may exist, for example, if one portion of a laterally extending container bottom with insufficient vertical height is not mirrored with another extension at a higher elevation along the elongated container. Such non-matching protrusion distances may permit slight tipping between adjacent containers. The cumulative effect of slight tipping between adjacent containers of a plurality of containers may cause one or more of the containers to tip over as they pass their tip angle. Many exemplary containers 30 may be designed with an upper lip 32 which also extends out beyond the perimeter of the container body 34, perhaps to the extent of the container bottom, in order to at least partially counter the cumulative tipping effect. In exemplary embodiments, the container bottom 38 and the lip 32 may extend from the container body 34 from 0 cm to about 0.60 cm. In exemplary embodiments, the container bottom 38 and the container lip 32 extend outwardly approximately the same distance. In other exemplary embodiments, the container bottom 38 extends further than the container lip 32 wherein additional structure may be applied to the container lip, as described below, to at least partially counter the cumulative tipping effect.

As illustrated in FIG. 1, the container 30 may also include an over-cap 68. The over-cap 68 protects the membrane lid 66 and/or acts as a closure once the membrane lid 66 is removed. An exemplary over-cap for use with the inventive concepts of the present invention is disclosed in U.S. Provisional Application No. 60/248,089, filed Nov. 13, 2000, and also U.S. Publication No. 2002/0107127A1, publication date Aug. 8, 2002 (now abandoned), the entire disclosures of which are incorporated herein by reference.

The membrane lid 66 and the over-cap 68 will extend outwardly from the lip 32. Accordingly, in exemplary embodiments, the membrane lid 66 and/or the over-cap 68 can extend outwardly from the upper lip 32 to have approximately the same width as the enlarged container bottom 38 to thereby reduce or prevent the cumulative tipping effect between the containers.

Providing an enlarged container bottom 38 and an extended container lip 32 may also create a recessed area along the container body 34 between the container bottom 38 and lip 32. This area can also be designed to seat a label or other surface for displaying indicia contained thereon. Seating such a label or surface in the recessed area between the lip 32 and the enlarged container bottom 38 can reduce scuffing, tearing, ripping, puncturing, or damaging of the label.

In exemplary embodiments, the lip 32 can extend outwardly beyond the perimeter of the container body 34 a distance of from about 0.20 cm in the corner and to about 0.15 cm on the container sides, whereas, the enlarged container bottom 38 extends outwardly beyond the perimeter of the container body 34 a distance of from about 0.15 cm in the corner and to about 0.30 cm on the container sides.

Providing an enlarged container bottom 38 also assists in increasing the surface area of the inwardly concave surface 44. In fact, with an enlarged container bottom 38 in accordance with the present invention, the outer edge 46 of the bottom wall 42 may have dimensions substantially equal to the cross-sectional profile of the container body 34 to facilitate loading of chips within the container 30. Thus, in particular embodiments of the present invention, the width "$W_2$"

(best illustrated in FIG. 7) can be less than or approximately equal to the corresponding width "$W_4$" (best illustrated in FIG. 1) of the container body 34 wherein "$W_4$" equals the corresponding distance between the exterior or interior surfaces of the corners, for example.

In addition or as an alternative to an extending lip to assist in maintaining the vertical orientation of the container, the container bottom 38 may have a sufficient vertical height "$H_2$" (See FIG. 9) to help maintain a plurality of containers 30 vertically oriented if they are introduced to abut one another. Indeed, as the vertical height "$H_2$" increases, leverage of a disrupting force is decreased, thereby reducing the tendency of the containers to tip relative to one another. Increasing the vertical height "$H_2$" can also reduce "shingling" between containers. Shingling occurs when one container bottom of a container ramps or rides up on the container bottom of another adjacent container. A sufficient vertical height "$H_2$" will reduce or even substantially prevent shingling by the substantial offset that would be required for one container bottom to ride on another container bottom. In order to reduce tipping and shingling of the containers while providing a feasible structure for blow molding, the vertical height "$H_2$" may be at least about 3 mm. In another embodiment, "$H_2$" may be from about 10 mm to about 30 mm. In still another embodiment "$H_2$" is about 18 mm.

Figure 13:
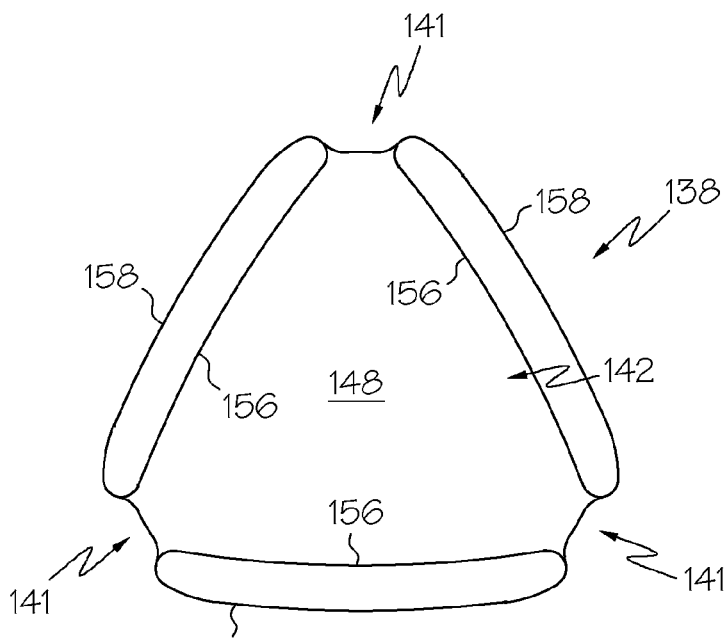
FIG. 13 is a bottom plan view of a substantially triangular container bottom in accordance with another embodiment of the present invention.
Figure 14:
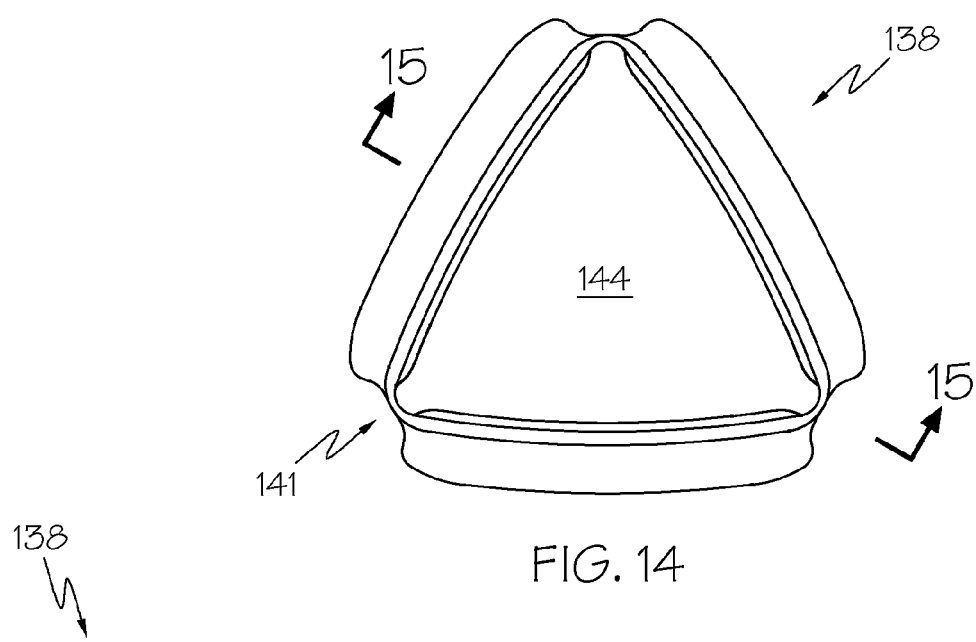
FIG. 14 is a top plan view of the substantially triangular container bottom of FIG. 13 showing the inwardly concave bottom surface.
Figure 15:
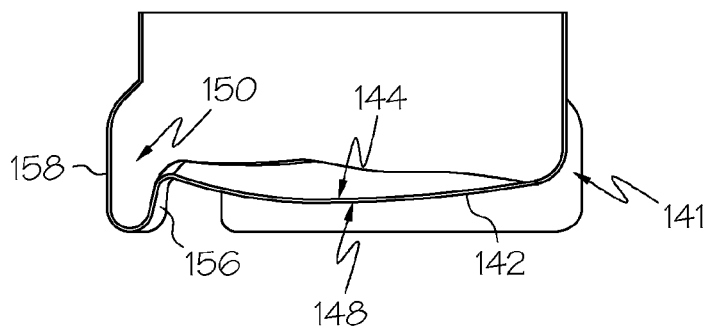
FIG. 15 is a sectional view taken along line 15-15 of FIG. 14.

FIGS. 13-15 illustrate another exemplary embodiment of a container bottom 138 in accordance with other embodiments of the present invention. The container bottom 138 is similar to the container bottom 38 described above. For example, the container bottom 138 includes a bottom wall 142 having a convex outer surface 148 and a concave inner surface 144. As best illustrated in FIG. 15, the container bottom defines a plurality of lateral cavities 150 defined between an inner wall 156 and an outer wall 158 of the container bottom 138. Each lateral cavity 150 extends along a side of the substantially triangular-shaped bottom, between two adjacent corners thereof. The container bottom 138 may further include recessed corner portions 141 which are free of the lateral cavities 150 to reduce material costs and/or facilitate a blow molding process.

Figure 16:
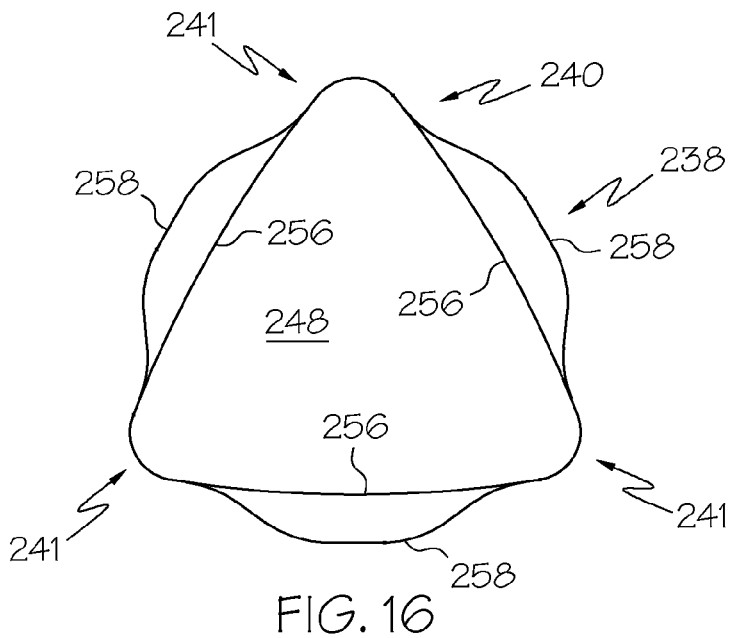
FIG. 16 is a bottom plan view of a substantially triangular container bottom in accordance with yet another embodiment of the present invention.
Figure 17:
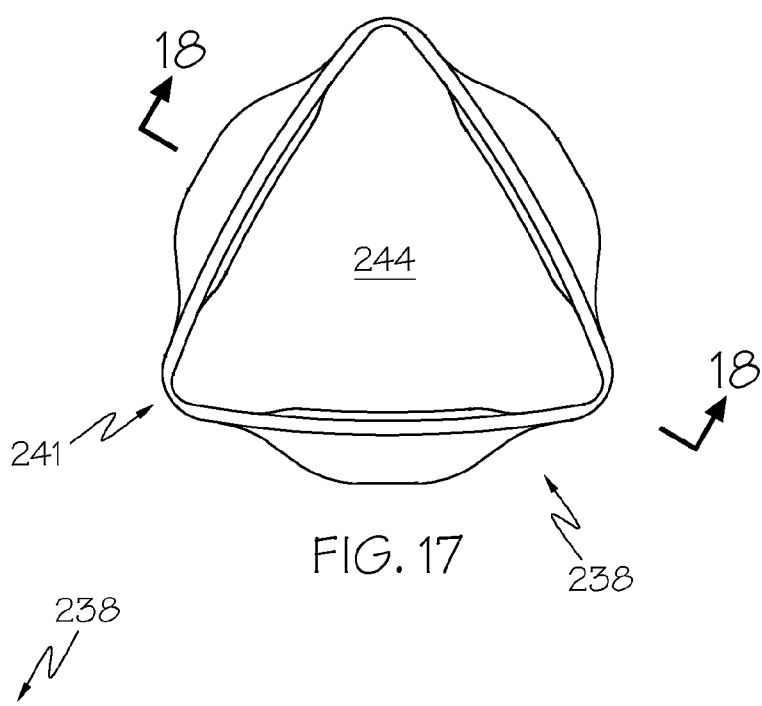
FIG. 17 is a top plan view of the substantially triangular container bottom of FIG. 16 showing the inwardly concave bottom surface.
Figure 18:
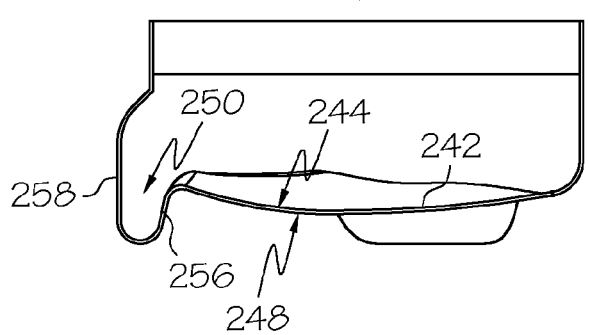
FIG. 18 is a sectional view taken along line 18-18 of FIG. 17.

FIGS. 16-18 illustrate yet another exemplary embodiment of a container bottom 238 in accordance with other embodiments of the present invention. The container bottom 238 is similar to the container bottoms 38 and 138 described above. The container bottom 238 comprises a bottom wall 242 having a convex outer surface 248 and a concave inner surface 244. The container bottom further includes an inner wall 256 and an outer wall 258 defining a plurality of lateral cavities 250. As evident from a comparison of FIGS. 16-18 with FIGS. 13-15, each of the lateral cavities 250 extends along only a portion of the side of the substantially triangular-shaped bottom between two adjacent corners. The container bottom 238 may further include recessed portions 241 at the corners and adjacent side portions which are free of the lateral cavities 250 to facilitate a blow molding process.

Figure 20:
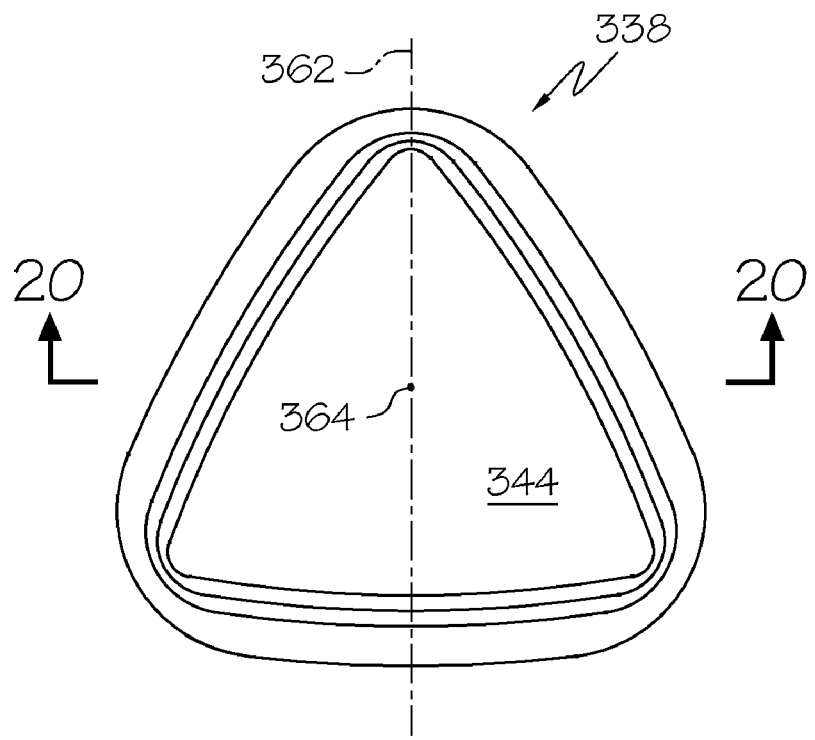
FIG. 20 is a top plan view of a substantially triangular container bottom in accordance with another embodiment of the present invention showing an inwardly cylindrically concave bottom surface.
Figure 21:
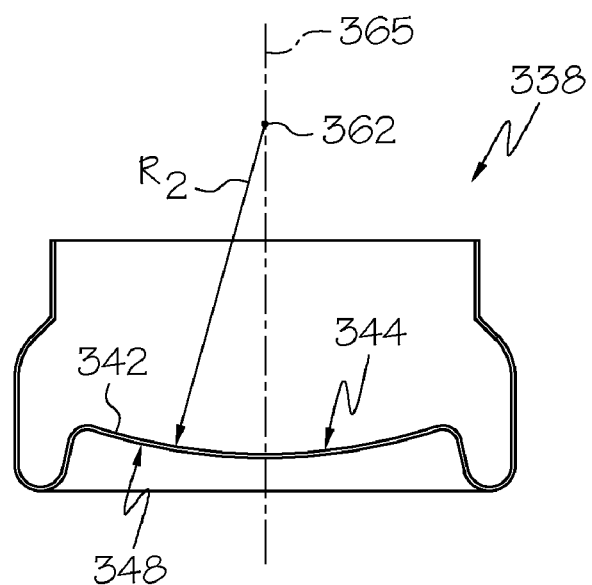
FIG. 21 is a sectional view along line 21-21 of FIG. 20.

FIGS. 20 and 21 illustrate an exemplary embodiment of a container bottom 338 similar to the container bottom 38 described above including a bottom wall 342 having a convex outer surface 348 and concave inner surface 344. The concave inner surface 344 includes a circularly cylindrically concave surface having a radius of curvature "$R_2$" and a center line of curvature 362. In one embodiment, the center line of curvature 362 intersects or is parallel with a bi-symmetrical plane 365 of the container bottom 338. In still further embodiments, the bi-symmetrical plane 365 of the container bottom 338 contains the center line of curvature 362, as shown in FIGS. 20 and 21. In additional embodiments, the center line of curvature 362 is perpendicular to the geometric central axis 364. In certain applications, it can be beneficial to provide the center line of curvature 362 adjacent or along the bi-symmetrical plane 365 and/or oriented perpendicular to the geometric central axis in order to facilitate alignment of the snack pieces relative to the container. In addition, as discussed above and with reference to FIG. 19 for example, concave surfaces other than circularly cylindrically concave surfaces may be used in accordance with the present invention.

Figure 22:
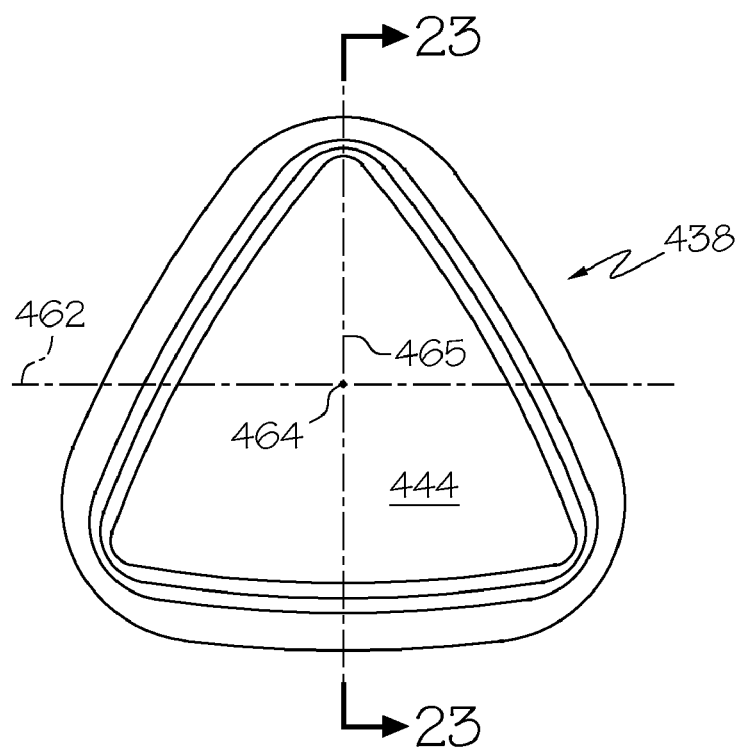
FIG. 22 is a top plan view of a substantially triangular container bottom in accordance with another embodiment of the present invention showing an inwardly cylindrically concave bottom surface.
Figure 23:
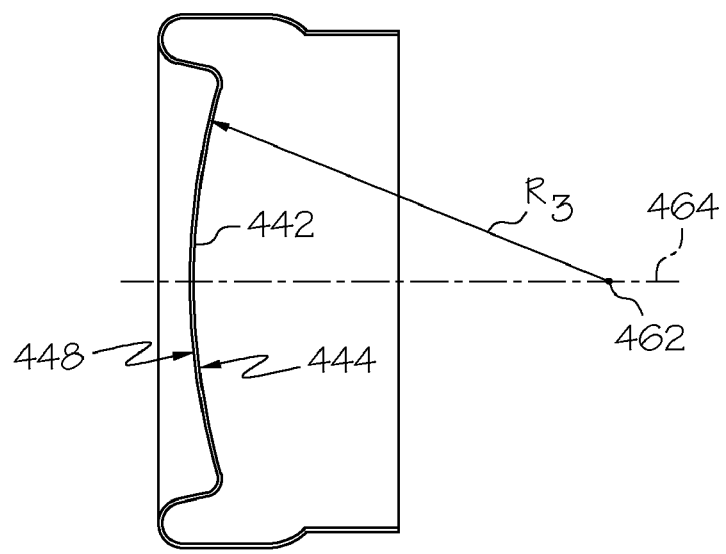
FIG. 23 is a sectional view along line 23-23 of FIG. 22.

FIGS. 22 and 23 illustrate another exemplary embodiment of a container bottom 438 similar to the container bottom 38 and 338 described above including a bottom wall 442 having a convex outer surface 448 and concave inner surface 444. The concave inner surface 444 includes a circularly cylindrically concave surface having a radius of curvature "$R_3$" and a center line of curvature 462. In one embodiment, the center line of curvature 462 intersects the bi-symmetrical plane 465 of the container bottom 438. In still further embodiments, the center line of curvature 462 intersects and is perpendicular with respect to the bi-symmetrical plane 465 of the container bottom 438. In additional embodiments, the center line of curvature 462 is perpendicular to the geometric central axis 464. It can be beneficial to provide the center line of curvature 462 perpendicular to the geometric central axis 464 and/or the bi-symmetrical plane 465 in order to facilitate alignment of the snack pieces relative to the container. Moreover, as discussed above and with reference to FIG. 19 for example, concave surfaces other than circularly cylindrically concave surfaces may be used in accordance with the present invention.

The center line of curvature 362 illustrated in FIGS. 20-21 is oriented substantially 90° relative to the centerline of curvature 364 illustrated in FIGS. 22-23 to accommodate a corresponding one of the snack pieces illustrated in FIGS. 24-25 and FIGS. 26-27. In alternative embodiments, the centerline of curvature could be located at other relative angles to accommodate various snack piece shapes.

Figure 24:
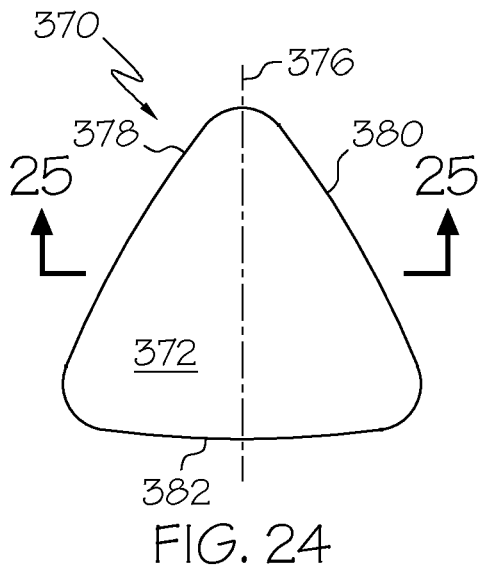
FIG. 24 is a partial sectional view of a substantially triangular snack piece in accordance with the present invention.
Figure 25:
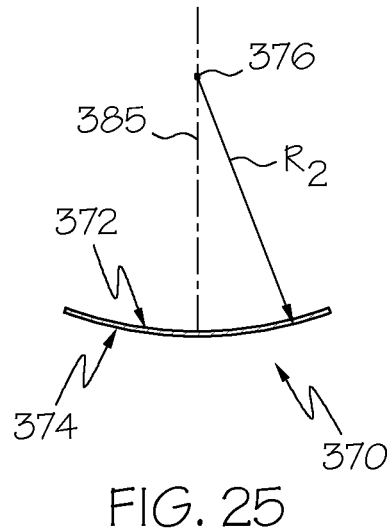
FIG. 25 is a sectional view along line 25-25 of FIG. 24.

FIGS. 24-25 illustrate another exemplary embodiment of a piece, such as a snack piece 370, that can be packaged in the containers and is adapted to cooperate with container bottoms of the present invention. In particular, the snack piece 370 includes a circularly cylindrically shaped inner concave surface 372 and a circularly cylindrically shaped outer convex surface 374. That is, the substantially triangular-shaped snack piece 370 can be formed with a concavity that conforms to the surface of a circular cylinder such that one edge 382 is curved while the other two edges 378, 380 remain substantially straight. The outer convex surface 374 is defined as a radial distance "$R_2$" from the center line of curvature 376. In one embodiment, the center line of curvature 376 is parallel with or intersects a bi-symmetrical plane 385 of the snack piece 370. In still further embodiments, the bi-symmetrical plane 385 of the snack piece 370 contains the centers line of curvature 376, as shown in FIGS. 24 and 25. The curvature of the snack piece 370 may be designed such that the outer convex surface 374 has a radius "$R_2$" similar or identical radius of curvature "$R_2$" of the inwardly concave surface 344 of the bottom wall 342 of the container bottom 338 (See FIGS. 20-21).

Figure 26:
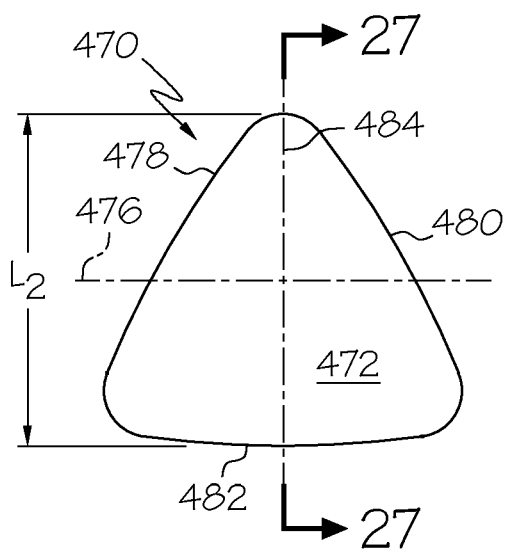
FIG. 26 is a partial sectional view of another substantially triangular snack piece in accordance with another embodiment of the present invention.
Figure 27:
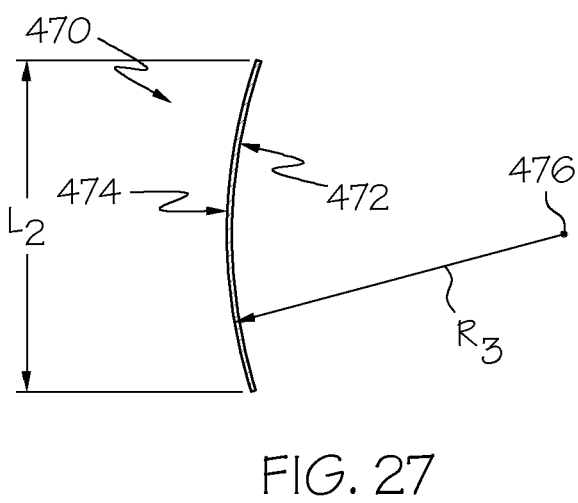
FIG. 27 is a sectional view along line 27-27 of FIG. 26.

FIGS. 26-27 illustrate yet another exemplary embodiment of a piece, such as a snack piece 470, that can be packaged in the containers and is adapted to cooperate with container bottoms of the present invention. The snack piece 470 may have a circularly cylindrically shaped inner concave surface 472 and a circularly cylindrically shaped outer convex surface 474. That is, the substantially triangular-shaped snack piece 470 can be formed with a concavity that conforms to the surface of a circular cylinder such that two edges 478, 480 are curved while the third edge 482 remains substantially straight. The outer convex surface 474 is defined at a radial distance "$R_3$" from the center line of curvature 476. In one embodiment, the center line of curvature 476 intersects a bi-symmetrical plane 484 of the snack piece 470. In still further embodiments, the center line of curvature 476 is perpendicular to the bi-symmetrical plane 484 of the snack piece 470. The curvature of the snack piece 470 may be designed such that the outer convex surface 474 has a radius "$R_3$" similar or identical radius of curvature as the radius of curvature "$R_3$" of the inwardly concave surface 444 of the bottom wall 442 of the container bottom 438 (See FIGS. 22-23).

Inventive methods of loading a plurality of pieces (i.e., articles) in a container will now be described with reference to FIGS. 3-5. In one embodiment, the method includes the steps of providing a container 30 defining an interior chamber 36 and comprising a bottom wall 42 including an inner surface 44. In certain embodiments, the inner surface 44 is substantially planar while other embodiments provide a surface that is concave towards the interior chamber. A stack of articles is also provided (e.g., see 70 generally in FIG. 3). In some embodiments, although not shown, each of the articles have a substantially flat surface. In additional embodiments, each of the articles of the stack of articles includes a convex surface 74 for engagement with the concave surface 44 of the bottom wall 42. In particular embodiment, the articles 70 each comprise a thin piece with a convex surface 74 on one side and a concave surface 72 on the other side.

Figure 4:
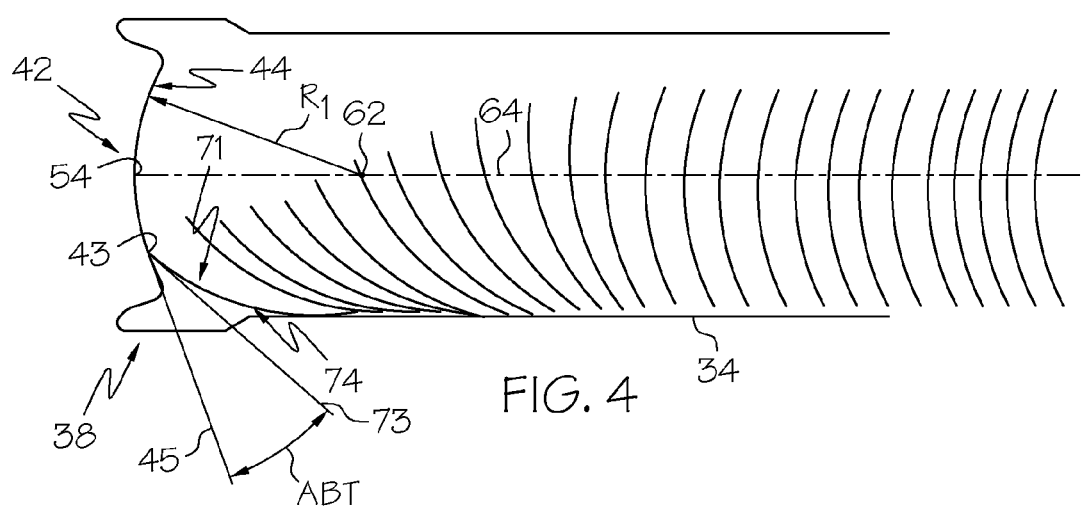
FIG. 4 is a schematic sectional illustration of a horizontally disposed container with the concave snack pieces being further inserted to a point where the leading concave snack piece initially contacts the inwardly concave bottom surface.

As illustrated in FIGS. 3 and 4, the method of loading further includes the step of inserting the stack of articles at least partially into the interior chamber until the leading article 71 of the stack of articles initially contacts the concave surface 44 of the bottom wall 42 at an initial contact point 43. In fact, a leading surface portion of the convex surface 74, rather than an edge of the article, contacts the concave surface 44 of the bottom wall 42 at the contact point 43. The curvature of the snack piece surface, especially the leading surface portion of a convex surface of the snack piece, and the surface of the bottom wall should be structured to facilitate reorienting the leading snack piece, and remaining snack pieces, in proper stacked alignment. Snack pieces having planar surfaces may be reoriented when the bottom wall has a concave surface with a sufficiently small radius of curvature while a planar bottom wall may be effective to reorient a snack piece having a convex surface with a sufficiently small radius of curvature.

Providing a defined relationship between the surface configuration of the snack piece and the bottom wall surface configuration permits the desired reorientation. More specifically, a sufficiently low Angle Between Tangent(s) ("ABT") will permit proper reorientation of the leading snack piece. The ABT can be viewed along a sectional plane including the initial point of contact (initial point of contact 43 as seen in FIG. 4) and extending parallel with or including the geometric central axis (geometric central axis 64 as seen in FIG. 4) of the container bottom. The initial contact point is the point on the inner surface of the bottom wall where the leading snack piece 71 initially contacts the bottom wall 42 when loading a stack of snack pieces within the interior chamber of the container. In exemplary embodiments, the ABT is the angle between a tangent line of a curved surface of a snack piece at the initial contact point and the tangent line of the concave bottom surface at the initial contact point. In alternative embodiments, the ABT is the angle between the substantially planar surface of a substantially planar snack piece and the tangent line of the concave bottom surface at the initial contact point. In still further embodiments the ABT is the angle between a tangent line of a curved surface of a snack piece at the initial contact point and the substantially planar surface of a substantially planar bottom wall. With a snack piece having surface informalities, such as bubbles protrusions or the like, the tangent (or the substantially planar surface) of the snack piece is approximated from the overall curved or flat configuration of the snack piece.

In one example, as shown in the schematic cross section of FIG. 4, along a cross sectional plane including a geometric central axis 64 and the initial contact point 43, the ABT is the angle between the tangent line 73 of the convex surface 74 of the leading snack piece 71 at the contact point 43 and the tangent line 45 of the concave surface 44 at the contact point 43.

In the exemplary embodiments described above, the ABT not greater than about 45°. In more particular embodiments, the ABT is not greater than about 35°. In still more particular embodiments, the ABT is not greater than about 25°. In further particular embodiments the ABT is not greater than about 15°.

Turning to FIGS. 5 and 6, for example, the snack piece 70 can have a length "$L_1$" of about 65 mm with a spherically convex surface 74 having a radius of curvature of about 54 mm (i.e., the radius of curvature $R_4$ of the concave surface 72 plus the thickness of the snack piece 70). To package this snack piece with an ABT of about 35°, the spherically concave surface 44 of the bottom wall 42 can be designed with a radius of curvature $R_1$ of about 86 mm.

With respect to FIGS. 26 and 27, another exemplary snack piece 470 can have a length "$L_2$" of about 55 mm with a convex surface having a radius $R_3$ of about 33 mm. A snack piece having this radius of curvature could be loaded against a substantially flat bottom wall while maintaining the ABT between 24° and 28°. For example, when loading a snack piece with this curvature against a substantially rigid bottom wall, the ABT is about 28°. In other embodiments, the bottom wall may have limited flexibility. For example, a bottom wall can comprise a membrane that will later act as a removable membrane lid of the container. When the leading snack piece engages the membrane, the membrane may flex such that the membrane displays a curvature that substantially conforms to a sphere with a radius of about 200 mm at the point of contact. With this flexing of the membrane at the contact point, the resulting ABT can be reduced to about 24°.

The leading surface of a snack piece could also be designed with a sufficient radius, that might be different or the same as the radius of the other chip surfaces to provide a sufficient ABT for loading.

The maximum ABT angle permissible may change due to frictional forces between the chip and bottom wall. For example, the maximum ABT may need to be reduced when the coefficient of friction of the materials increases.

Loading of chips can be achieved with a variety of structures and/or processes. For example, although not shown, a plunger, trough, or loading mechanism may be used to load articles. As illustrated in FIGS. 3-5, the method of loading a plurality of pieces further comprises the step of reorienting the leading article 71 by forcing the leading article against the surface of the bottom wall (e.g. the concave surface 44 of the bottom wall 42). A wide variety of methods could be used to force the leading article 71 against the bottom wall surface. For example, an actuator such as a plunger could be used to force the articles into the container. In still another embodiment, a plurality of articles could be stacked on a trough wherein the trough and/or the container 30 are pivoted such that the force of gravity forces the stack including the leading article 71 such that the leading article 71 is forced against the surface of the bottom wall. In one particular example, a trough could be lined up with the opening of the container with a plurality of articles located on the trough. The trough and container can be rotated together such that the articles slide into the container until they form the stack similar to the stack of articles in a container shown in FIG. 5. It will be understood that the loading angle of the rotated container and trough should be sufficiently large to cause a sufficient article velocity but should be small enough to avoid excessive velocities that might otherwise crush or break one or more of the articles due to the impulse generated by colliding with the bottom wall.

In still another embodiment, the stack of articles could be inserted in the interior chamber and then the container 30 could be rotated with respect to the vertical direction to allow the force of gravity to move the stack of chips toward the bottom and force the leading chip 71 against the concave surface 44. Thus, the leading article 71 may be forced against the concave surface by directly moving the stack or simply rotating the container to permit the force of gravity to move the stack.

In still further embodiments, the stack of articles could be inserted into the interior chamber 36 of the container such that the stack of articles is inserted in a substantially horizontal direction during at least a period of time when loading. This may likely occur if the container 30 is oriented in the horizontal position when receiving the articles. In another example, the stack of articles could be inserted in a substantially non-horizontal direction during a period of time. For instance, the container could be tipped to a loading angle when inserting the articles in a substantially non-horizontal direction. The loading angle would permit the chips to be loaded by sliding down into the container under the influence of gravity. The load angle could be enlarged to increase the velocity of the chips as they are entering the container, thereby reducing the article loading time for each container. Moreover, the loading angle of the container could be decreased to reduce the velocity of the articles to an appropriate level to reduce article breakage that might otherwise occur as the leading chip impacts the bottom wall. Further, the loading angle of the container could be modified throughout or at least once while inserting the stack of articles in the container. For example, the container could be tipped at a large initial load angle to provide the chips with a larger initial velocity and then reduced to a final load angle before the leading chip experiences the impulse from contacting the bottom wall. Therefore, the loading time can be reduced while minimizing the impulse of the articles contacting the bottom wall.

The specific embodiments and examples set forth above are provided for illustrative purposes only and are not intended to limit the scope of the following claims. Additional embodiments of the invention and advantages provided thereby will be apparent to one of ordinary skill in the art and are within the scope of the claims.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of loading a plurality of articles in a container comprising the steps of:
   a) providing a container having a body and defining an interior chamber, the container comprising a bottom wall including an inner surface, wherein the bottom wall is substantially inwardly concave towards the interior chamber;
   b) providing a stack of articles comprising snack pieces having a convex surface;
   c) inserting the stack of articles at least partially into the interior chamber until a surface portion of the leading article of the stack of articles contacts the inner surface of the bottom wall with an Angle Between Tangents of less than or equal to about 45°, wherein the Angle Between Tangents comprises the angle between a tangent line of a curved surface of the leading article at the initial contact point between the leading article and the inner surface and a tangent line of the inner surface at the initial contact point; and
   d) reorienting the leading article by forcing the leading article against the inner surface such that the convex surface of the article cooperates with the inner surface.

2. The method of claim 1, further comprising the step of rotating the container to change the orientation of the container with respect to a vertical axis.

3. The method of claim 1, wherein the stack of articles are inserted in a substantially horizontal direction.

4. The method of claim 1, and
   wherein the container has a radial distance between the body and a central axis that is perpendicular to the planar projected foot print of the container and through the center of gravity of the surface; and
   wherein the bottom wall of the container comprises a central surface area, the central surface area having points along its perimeter that extend less than about 85% of the maximum radial distance between the container body and a geometric central axis.

5. The method of claim 1, wherein the inner surface is concave towards the interior chamber.

* * * * *